Dec. 13, 1955  B. J. CRAIG  2,726,536
VEHICLE DOOR LOCK CONTROLLED ENGINE CIRCUIT
Filed April 9, 1953
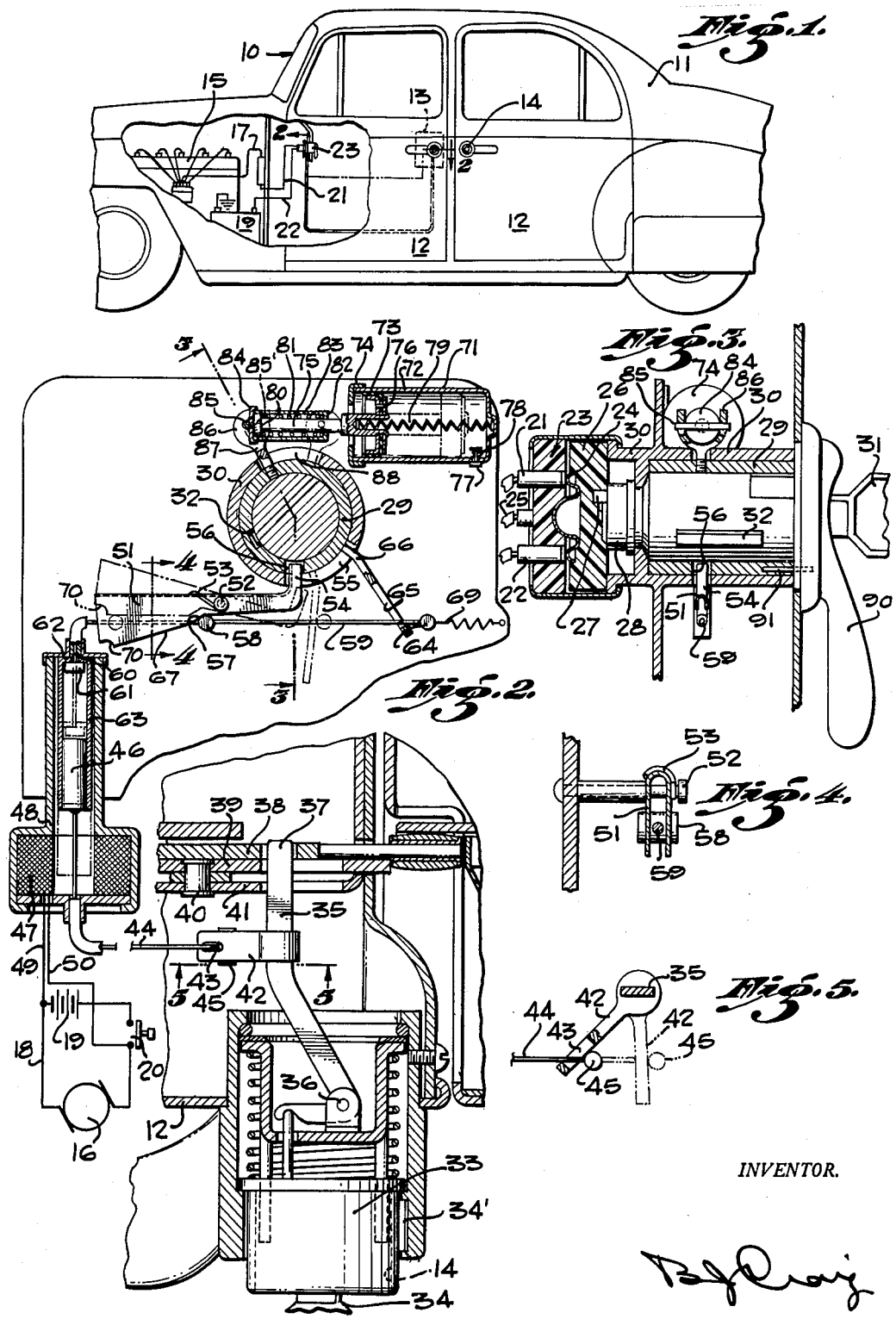
INVENTOR.
B. J. Craig United States Patent Office 2,726,536
Patented Dec. 13, 1955

2,726,536

VEHICLE DOOR LOCK CONTROLLED ENGINE CIRCUIT

Burnie J. Craig, Pasadena, Calif.

Application April 9, 1953, Serial No. 347,672

21 Claims. (Cl. 70—265)

This invention relates to a vehicle door lock controlled engine circuit.

In operating an automobile the person driving will first unlock one of the doors of the vehicle by means of a key. He will then remove the key from the door, enter the vehicle with the key in his hand, insert the key in the ignition lock and will turn on the ignition switch. He will then start the engine and operate the vehicle. At his destination he will turn off the ignition switch, remove the key from the ignition lock and place it in his pocket. Sometimes he will forget to remove the key from the lock and the vehicle may be stolen. It is a source of annoyance that the driver must twice move locks to unlocked position and must twice remove a key from its lock in a vehicle operating cycle.

The present invention overcomes the objections mentioned by providing means whereby only one unlocking of a vehicle lock is required to permit the vehicle to be started, operated and the engine stopped, and the invention provides means whereby the unlocking of a secret door lock by a key will render the ignition switch of the vehicle operative to cause the engine to operate without unlocking the ignition switch lock.

More specifically, one embodiment of the present invention provides a construction wherein the unlocking of the vehicle door by secret means will condition the engine so that it may be operated and wherein should the operator so condition the engine and fail to start the engine, the engine will after a time be rendered ineffective to be operated. With this last mentioned construction any likelihood of the vehicle being thoughtlessly left in operative condition, so that it may be readily stolen, will be overcome.

In other words, the invention provides means whereby the operator of a vehicle may simply remove the key from his pocket, unlock the door, replace the key in his pocket, enter the vehicle and drive away. At his destination he may turn off the iginition switch without the aid of a key.

Thus it will be seen that with the present invention one use of a single key in a single lock permits completion of the cycle of unlocking all of the vehicle doors, turning on the ignition switch, and turning off the ignition switch.

The general object of the invention is to therefore provide an automotive vehicle which has a door and a latch for the door and has a lock for the door latch and wherein operation of the door lock controls operation of the vehicle engine.

Another object of the invention is to provide a secret unlocking means, the operation of which coincidentally permits operation of the door latch to open a door and renders the control means of an automotive vehicle engine operable to cause the engine to run.

A more specific object of the invention is to provide an automotive vehicle which includes a driving engine and a door having a lock which may be unlocked from without the vehicle by a secret lock with means whereby when the secret door is unlocked, the engine will be conditioned for operation.

Another object of the invention is to provide novel means for controlling the ignition circuit of a motor vehicle.

Another object of the invention is to provide novel means for controlling the ignition switch of a motor vehicle.

Another object of the invention is to provide means for rendering the ignition switch of a motor vehicle operative to start the engine when the vehicle door lock is unlocked by secret unlocking means.

A further object of the invention is to provide an improved ignition switch for a motor vehicle circuit wherein the switch may be operated to circuit closing position by secret lock means operable from within or without the vehicle.

Another object of the invention is to provide a time controlled switch for the ignition circuit of an automobile engine.

A further object of the invention is to provide a novel time controlled means for controlling the ignition switch of an automobile engine.

A further object of the invention is to provide an improved secret door lock controlled ignition switch for a motor vehicle circuit wherein the switch when first operated to circuit closed position is thereafter operated to circuit open position.

Other objects and advantages of the invention will be apparent from the following description taken in connection with the accompanying drawings, wherein:

Fig. 1 is a side elevation of a motor vehicle with parts broken away showing the invention.

Fig. 2 is an enlarged sectional view taken on line 2—2, Fig. 1.

Fig. 3 is a section taken on line 3—3, Fig. 2.

Fig. 4 is a section taken on line 4—4, Fig. 2; and

Fig. 5 is a section taken on line 5—5, Fig. 2.

Referring to the drawing by reference characters the invention is shown as embodied in an automotive vehicle which is indicated generally at 10. The vehicle includes a body 11 having doors 12 and having door latches 13 which are released by push buttons 14. The vehicle is driven by an engine 15 which includes a starter 16, an ignition circuit 17 and a starter circuit 18. The starter and the ignition may be suitably actuated by a battery 19.

The starter circuit includes a switch 20 and the ignition circuit includes leads 21 and 22 of a switch 23 which includes a rotating circuit closer 24. The switch 23 may also include a third contact 25 which may operate accessories such as an instrument panel light, which is thereby turned on by the ignition switch. The circuit closer 24 is mounted on a rotary disk member 26 which is shifted to "on" and "off" positions by an eccentric pin 27 mounted on the core 28 of a lock barrel 29 in a lock body 30.

The ignition switch 23 is of conventional type and includes a key operated structure which, when the key 31 is rotated, a locking member 32 will be withdrawn permitting the core 28 to rotate within the barrel 29 and thus turn the pin 27 to move the switch 23 to "on" and "off" position, depending upon the direction in which the key 31 is turned.

In Fig. 2, I show details of the push button 14. This push button lock and latch construction is like that described fully in applicant's co-pending application Serial No. 185,412, filed September 18, 1950, now Patent No. 2,687,031, granted August 24, 1954. The particular details of the construction is of no particular moment here except that it shows a lock barrel 33, which is operated by insertion of a key 34 to free a dog 34' and permit the member 14 to be rotated. This will cause an actuating member 35 to be rotated about the axis of the member 14 when the key is inserted and turned. When the push button 14 is pushed inwardly it rocks the actuating member 35 about a pivot 36 to cause the end 37 of the actuating member to move to the right in Fig. 2 to release a latch bolt (not shown).

When the actuating member is rotated about the axis of the lock barrel 33, after the key has been inserted, the end 37 swings downwardly in Fig. 2 and it rocks a locking member 39 which is pivoted at 40 to the lock body 41 from locked position to unlocked position and vice versa.

The actuating member 35 has an arm 42 fixed thereon. The arm has a slot 43 through which the traction member 44 of a Bowden wire extends. The traction member has a head 45 thereon. The Bowden wire extends through the door and across the hinge line to the instrument panel where it is connected to the armature 46 of a solenoid 47 which is arranged in a housing 48. The solenoid is connected by leads 49 and 50 with the battery 19 and the starter switch 20 so that when the starter is actuated the solenoid will also be energized.

The core 46, however, is normally sufficiently far removed from the solenoid coil 47 that it is not operated by the solenoid but it will, under certain conditions, be operated by the solenoid as will be hereinafter described.

To enable the ignition switch 23 to be moved to "on" position without the use of the inside key 31, the disclosure includes an arm 51 which is pivoted at 52 and which is normally urged to the full line position in Fig. 2 by a spring 53. The arm 51 has an ear 54 thereon which passes through a slot 55 in the lock body 30 and enters a notch 56 in the lock barrel 29. Thus the ear 54 normally prevents rotation of the lock barrel in the body 30.

To enable the ear 54 to be withdrawn the arm 51 is provided with a cam surface 57 which is engaged by a cylindrical member 58 fixed on the tension member 59 of a Bowden wire 60. The Bowden wire 60 extends into the solenoid casing 48 and is connected to a piston 61. An internal flange 62 on the upper end of a tubular casing 63 in which the armature 46 is fixedly secured, engages the piston to limit upward movement of the piston in the casing.

When the actuating member 35 is turned the arm 42 thereon will pull the head 45 fixed to the traction member 44, thus pulling the armature member 46 downwardly in Fig. 2 and thereby causing the flange 62 to pull down the piston 61 and the wire 59 with it. This action will move the member 58, which will then engage the cam surface 57 which surface is abruptly pitched and will rock the arm 51 to move the ear 54 out of the notch 56, thus freeing the lock barrel 29 from the lock body 30 and allowing the lock barrel 29 and the switch member 26 carried thereby to be turned by a cylindrical member 64 on the wire 59 which passes through a slot 65 in an arm 66 which is connected to the lock barrel 29.

During this movement the member 58 moves along a dwell surface 67 on the arm 51 and this dwell surface 67 is so positioned that once the member 58 has moved the cam surface 57 abruptly to quickly move the ear 54 from the notch 56, there will be no further movement of the arm 51 while the member 58 rides along the cam surface 67 and while the member 64 is moving the arm 66 to close the switch 23.

The member 64 is normaly pulled to the right in Fig. 2 by a spring 69 so that the member 64 is slightly spaced from the arm 66. This spacing allows the wire 59 to move slightly and causes the member 58 to engage the abrupt cam surface 57 and pull the ear 54 from the notch 56 before the member 64 engages the arm 66 and starts movement of this arm to a position to close the switch 23.

The arm 51 in advance of the cam surface 67 has a notch 70 therein into which the member 58 may move for reasons to be presently described.

The angular travel of the actuating member 35 is such that it will pull the wires 44 and 59 and the member 58 to the position shown in broken lines in Fig. 2. In this position the member 58 has moved to the end of the cam surface 67 and is about to enter the notch 70. However, movement of the arm 42 is so limited that it cannot move the member 58 so that it will enter the notch 70. Operation of the car door outside lock by the secret means 34 will leave the parts in the position just described. In this last described position of the parts and after the key 34 has been returned to normal position, the member 58 may be moved to the right in Fig. 2 without difficulty by a time controlled member 71.

From the foregoing description it will be apparent that when the outside secret lock has been operated to unlocked position, the switch 23 will have been moved to ignition circuit closing position and that the switch in this last mentioned position is then free to be moved to ignition open position by the time controlled device to be now described.

The time device 71 includes a cylinder 72 in which a piston 73 reciprocates. The cylinder has a closure 74 thereon through which a piston rod 75 on the piston reciprocates. The piston includes a bleed aperture 76. The cylinder has a one-way valve 77 therein which is normally held seated by a spring 78 to permit air to pass from the cylinder and to prevent air from entering the cylinder. A spring 79 normally urges the piston forward.

The rod 75 has a collar 80 fixed thereon which engages one end of a spring 81, the other end of the spring engages a flange 82 on a sleeve 83 which has an end closure 84 with a transverse pin 85 (Fig. 3) therethrough. The pin 85 is arranged in slots 85' in the arms of a yoke 86 on an arm 87 which is secured to the lock barrel 29. The slots 85' are elongated to compensate for the angular movement of the arm 87. The arm 87 works in a slot 88 in the lock body 30.

In operation, when the key 34 turns the secret lock 33 and actuating member 35 to pull the wires 44 and 59, the member 64 will rotate the arm 66 and the arm 87 and the arm 87 will move the pin 85 to the right in Fig. 2, moving the piston 73 and forcing air from the cylinder 71 through the valve 77. When the parts are in the broken line position in Fig. 2, air will pass through the bleed aperture 76 and will allow the spring 79 to gradually advance the piston 73 and the piston rod 75 to slowly rotate the lock barrel 29 to ignition circuit open position.

To hold the switch in closed position so that the vehicle engine may be actuated and the vehicle operated, the circuit leads 49 and 50 and the starter switch 20 previously described, so function that when the starter switch 20 is moved to closed position to actuate the starter the circuit leads 49 and 50 to the solenoid 47 will simultaneously be actuated. This results in the starting of the engine provided the time elapsed between the unlocking of the secret door lock 14 and the closing of the starter switch 20 has not been long enough to allow the time member 71 to open the ignition switch 23.

The solenoid armature 46 is moved by the wire 44 into the effective area of the core 47 but it is removed from this area by the time device 71. The closing of the starter switch 20 may therefore actuate the solenoid armature 46 only for a short period of time during which the armature 46 is within the area where it may be operated by the solenoid 47.

When the arm 43 of the secret lock 33 moves the wires 44 and 59 to position the member 58 just short of the notch 70, the member 58 is then free to advance slightly when closing of the starter switch 20 causes operation of the solenoid core armature 46. This slight advance of the armature 46 moves the member 58 opposite the notch 70 whereupon the spring 53 rocks the arm 51 so that the notch 70 receives the member 58. This movement is not sufficient to move the ear 54 in the slot 55 to any great extent.

When the member 58 is in the notch 70 the friction is such that the time device 71 is not strong enough to overcome the added friction and thus the time device cannot operate and becomes ineffective to operate to open the switch. Thus when the starter switch is closed prior to the time that the time device 71 has moved the solenoid core 46 and associated parts to non-effective position the ignition switch 26 will remain in closed position until a manual switch closing member, to be presently described, is actuated.

A slight angular clockwise movement of the switch member 26 closes the ignition circuit. Thus when the switch 26 is moved to "on" position by the secret lock controlled member 35, it will remain in the "on" position through a relatively long period of time while the time controlled member 71 is functioning to turn it to "off" position. This period of time is sufficient to allow the operator to enter the vehicle and start the engine. Starting of the engine will cause the member 58 to enter the notch 70 and thus render the time device ineffective to open the ignition circuit.

Should the operator fail to start the engine within the time provided the time device 71 will enable the spring 53 to return the ear 54 into the notch 56 to thus lock the switch against movement to circuit closing position.

In order to open the ignition circuit and stop the engine when the ignition is held on by engagement of the member 58 in the notch 70, the lock barrel 29 is provided with a handle 90 which is connected to the lock barrel as by a member 91. When the handle 90 is turned anti-clockwise, the arm 87 will be turned and the pin 85 will move the sleeve 83 linearly. This will cause the flange 82 to compress the spring 81 so that a lost motion device is provided. This lost motion construction permits the switch 26 to be turned by the handle 90 without moving the piston 73. This enables the switch 26 to be turned off immediately and independently of the time device 71 which latter will then turn slowly to normal position.

Having thus described the invention, I claim:

1. A motor vehicle having an ignition circuit controlled internal combustion engine and a switch within the vehicle for controlling the ignition circuit, and which has a body provided with a door and has a secret locking member for the door, in combination with means actuated by movement of the secret locking member to unlocked position to actuate the ignition controlling switch to "on" position.

2. An automobile including a body having a door with a door lock and having a driving engine which includes an engine operating circuit, a switch within the body for controlling the circuit, an unlocking member for the door lock, and means operated by movement of the unlocking member to unlocked position for closing the switch to render the engine operating circuit operable to permit the engine to run.

3. A vehicle including a body having a driving engine which includes an ignition circuit and a circuit control member within the body for closing the circuit, a door for the body, a latch for the door, a lock for the door latch, and means including an actuating member extending from the door lock to the circuit control member and operated by movement of the door lock to unlocked position to move the circuit closing control member to circuit closing position.

4. An automobile including a body having a door with a door lock and having a driving engine which includes a normally open circuit, circuit closing means within the body and operable to close the circuit, means normally preventing movement of the circuit closing means to circuit closing position, an unlocking member for the door lock, and actuating means extending from the unlocking member to the circuit closing means and operable when the door lock is unlocked to close the circuit closing means.

5. An automobile including a body having a door with a door lock and having a driving engine which includes an engine control member, a lock normally preventing operation of the control member, an unlocking member for the door lock, means operated by movement of the door lock unlocking member to unlocked position to move the control member to operative position, time controlled means to thereafter move the control member to inoperative position, and means to maintain the control member in operative position while the engine is running.

6. A vehicle including a body having a driving engine which includes an ignition circuit including a switch, a door for the body, a latch for the door, a lock for the door latch and means including an actuating member extending from the door lock to the circuit switch and operated by movement of the door lock to unlocked position for closing the ignition circuit switch, and time controlled means to thereafter open the circuit closing switch.

7. An automobile including a body having a door with a lock for the door and having a driving engine which includes an ignition circuit having a switch, a secret door lock unlocking member, means including an actuating member extending to the ignition circuit switch for simultaneously moving the ignition circuit switch to closed position when the door unlocking member is moved to door unlocking position and time controlled means to thereafter open said ignition circuit switch.

8. An automotive vehicle construction including a body, an engine for driving said body, said engine including an operating electrical circuit, a normally open switch in said circuit, a door for said body, a lock for said door, secret means for unlocking the lock and actuating means connecting the door lock and switch and operable when the secret door lock is moved from locked to unlocked position to simultaneously close said switch, time controlled means to thereafter open the switch and means to maintain the switch closed while the engine is running.

9. An automotive vehicle construction including a body, an engine for driving said body, said engine including an operating electrical circuit, a normally open switch in said circuit, a door for said body, a lock for said door, secret means for unlocking the lock, actuating means connecting the door lock and switch and operable when the secret door lock is moved from locked to unlocked position to simultaneously operate said switch to close the circuit, said actuating means including a time controlled device operable to thereafter open the circuit and means to maintain the switch closed while the engine is running.

10. In an ignition system for a motor vehicle engine, a member movably mounted and having ignition switch closing means thereon, means normally preventing movement of said switch closing means to closing position, a locking member, means operable by the movement of the locking member to unlocked position to shift the preventing means to non-preventing position, time controlled means to return the preventing means to preventing position after it has moved to non-preventing position and means for rendering the time controlled means ineffective to return the preventing means to preventing position.

11. An automotive vehicle construction including a body, an engine for driving said body, said engine including an operating circuit, a switch controlling said circuit, means for operating said switch to "on" and "off" positions, a lock controlling said switch, a door for said body, a secret lock for the door, means for operating said secret door lock to unlocked position, actuating means operable when the secret door lock operating means is moved from locked to unlocked position to close said switch, time controlled means to thereafter open said switch and means to maintain the switch closed while the engine is running.

12. In an ignition circuit for a motor vehicle which includes a body and an engine, a starter and an ignition switch, a key controlled lock normally preventing closing the switch, means independent of the key controlled lock and operable to close the circuit, means normally preventing operation of the said means, secret lock operated means operative to move the preventing means to non-preventing position, time controlled means to thereafter move the preventing means to preventing position, and means operated upon starter actuation for rendering the time controlled means ineffective to return the preventing means to preventing position.

13. An automotive vehicle construction including a body, an engine for driving said body, said engine including a starter and an operating electrical circuit, a normally open switch in said circuit, a door for said body, a lock for said door, secret means for unlocking the lock, actuating means connecting the door lock and switch and operable when the secret door lock is moved from locked to unlocked position to simultaneously operate said switch to close the circuit, said actuating means including a time controlled device operable to thereafter open the circuit and means operated upon starter actuation effective before the time controlled means has functioned to open the circuit to render the time controlled means ineffective to open the circuit.

14. A vehicle door, a latch for the door, secret means outside the vehicle for locking and unlocking the latch, an engine for driving the vehicle, a starter and an ignition circuit for the engine, a switch for the ignition circuit, a lock controlled member for moving the switch to "on" and "off" positions, time controlled means operated by the secret unlocking means for first closing the ignition circuit while the ignition circuit lock remains locked and thereafter opening the ignition circuit and means operated upon starter actuation for rendering the time controlled means ineffective to open the circuit after it has closed the circuit.

15. An automobile including a body having a door with a door lock and having a driving engine which includes an ignition circuit having a switch, and a starter circuit, an unlocking member for the door lock, means operated by movement of the unlocking member to unlocked position for operating the ignition circuit switch to thereby render the ignition circuit switch operable to operate the engine, time controlled means to thereafter render the ignition circuit ineffective to operate the engine and means operated upon starter actuation to render the time controlled means inoperative to cause the ignition circuit to be ineffective to start the engine.

16. A motor vehicle including a body provided with a door and with a secret lock for the door, the vehicle also including an internal combustion engine having a normally open ignition circuit, in combination with means operated by the secret door lock when the secret door lock is unlocked to close the ignition circuit and means within the body operable, while the door lock is locked to close the ignition circuit.

17. A motor vehicle including a body provided with a door and with a secret lock for the door, the vehicle also including an internal combustion engine having an ignition circuit, and lock controlled switch means within the body operable at all times when it is unlocked to close the ignition circuit, in combination with means operated by the secret door lock, and operable while the lock controlled switch means remains locked, to close the ignition circuit.

18. In an ignition circuit for a motor vehicle which vehicle includes a body, an engine, and a starter, the circuit including an ignition switch, and a key controlled lock normally preventing closing the ignition switch, in combination with means operable independent of the key controlled lock to close the ignition switch, means normally preventing operation of the said means, secret lock operated means operative to move the preventing means to non-preventing position, means tending thereafter to return the preventing means to preventing position, and means operative while the engine is running to repel the tendency of the last mentioned means to return the preventing means to preventing position.

19. An automobile including a body having a door, a latch for the door and a lock for the door latch, said automobile including a driving engine and an engine control member movable to an operative and to an inoperative position, releasable means for holding the control member in inoperative position, and means for actuating said door lock to unlocked position, in combination with means operative when the actuating means moves said door lock to unlocked position, while the control member is held in inoperative position, to release the control member holding means and to move the control member to operative position.

20. An automobile including a body having a door and a driving engine and having a control member to be moved to one position when the engine is running and to another position when the engine is not running, a latch for the door, a lock for the door latch, and a lock for said control member to lock said control member when it is disposed in the other position for the engine to stand idle, in combination with means operable when said door latch lock is moved to unlocked position to move the control member to the said one position.

21. An automobile including a body having a door, a latch for the door and a lock for the door latch, said automobile including a driving engine and an engine control member movable to an operative and to an inoperative position, a lock holding the control member in inoperative position, and means for actuating said door lock to an unlocked position, in combination with means operative when the actuating means moves said door lock to unlocked position, while the control member is held in inoperative position, to release the control member lock are to move the control member to operative position, means thereafter operative while the engine is idle to move the control member to inoperative position and means to maintain the control member in operative position while the engine is running.

References Cited in the file of this patent

UNITED STATES PATENTS

| | | |
|---|---|---|
| 1,948,913 | Gilpin | Feb. 27, 1934 |
| 2,661,621 | Stern | Dec. 8, 1953 |